(12) United States Patent
Cho

(10) Patent No.: US 7,522,933 B2
(45) Date of Patent: Apr. 21, 2009

(54) BLUETOOTH SYSTEM CAPABLE OF COMMUNICATING ON SCATTERNET AND COMMUNICATING METHOD THEREOF

(75) Inventor: Dong-Sik Cho, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 1059 days.

(21) Appl. No.: 10/300,912

(22) Filed: Nov. 21, 2002

(65) Prior Publication Data

US 2003/0140110 A1 Jul. 24, 2003

(30) Foreign Application Priority Data

Jan. 24, 2002 (KR) .................. 2002-4104

(51) Int. Cl.
*H04B 7/00* (2006.01)
(52) U.S. Cl. ..................... 455/519; 455/41.2
(58) Field of Classification Search ............... 455/41.2, 455/519
See application file for complete search history.

(56) References Cited

U.S. PATENT DOCUMENTS

| | | | |
|---|---|---|---|
| 6,026,297 A * | 2/2000 | Haartsen .................. | 455/426.1 |
| 6,950,645 B1 * | 9/2005 | Kammer et al. .......... | 455/343.1 |
| 6,975,613 B1 * | 12/2005 | Johansson ................. | 370/338 |
| 7,043,205 B1 * | 5/2006 | Caddes et al. ............. | 455/41.2 |
| 2002/0045425 A1 * | 4/2002 | Takeda et al. ............. | 455/41 |
| 2002/0150147 A1 * | 10/2002 | Liang ....................... | 375/133 |
| 2003/0013411 A1 * | 1/2003 | Uchiyama .................. | 455/40 |
| 2003/0076842 A1 * | 4/2003 | Johansson et al. ......... | 370/401 |
| 2003/0081603 A1 * | 5/2003 | Rune ......................... | 370/390 |
| 2004/0203382 A1 * | 10/2004 | Park .......................... | 455/41.2 |
| 2005/0041613 A1 * | 2/2005 | Kuhl et al. ................ | 370/320 |

(Continued)

FOREIGN PATENT DOCUMENTS

CN 1270726 A 10/2000

(Continued)

OTHER PUBLICATIONS

Haartsen J. "Bluetooth—The Universal Radio Interface for Ad Hoc, Wireless Connectivity", On—Ericsson Review, Ericsson. Stockholm, SE, No. 3, 1998, pp. 110-117, XP000783249.

*Primary Examiner*—Matthew D Anderson
*Assistant Examiner*—Bobbak Safaipour
(74) *Attorney, Agent, or Firm*—Sughrue Mion, PLLC

(57) ABSTRACT

Disclosed is a communicating method capable of preventing data collision for a Bluetooth system which communicates with a plurality of other Bluetooth systems on a scatternet. The communicating method of a Bluetooth system comprises the steps of: receiving a communication request signal from a second external device; scanning the received communication request signal to convert the operation of the Bluetooth system from as the master to the first external device into as a slave to the second external device; and transmitting a mode-converting request signal into the second external device to convert the link state of the Bluetooth system with the second external device into a sniff mode in converting the operation of the Bluetooth system from as the slave to the second external device into as the master to the first external device. As converting the link state with the second external device into the sniff mode while operating as the master to the first external device, the Bluetooth system can execute efficient data communication with the plurality of other Bluetooth systems on the scatternet.

12 Claims, 10 Drawing Sheets

U.S. PATENT DOCUMENTS

| | | | |
|---|---|---|---|
| 2005/0181725 A1* | 8/2005 | Dabak et al. | 455/41.2 |
| 2006/0183423 A1* | 8/2006 | Johansson | 455/41.2 |
| 2006/0189359 A1* | 8/2006 | Kammer et al. | 455/574 |
| 2006/0227741 A1* | 10/2006 | Lappetelainen | 370/329 |

FOREIGN PATENT DOCUMENTS

| | | |
|---|---|---|
| EP | 1 052 867 A1 | 11/2000 |
| JP | 2001-517022 A | 10/2001 |
| WO | WO 01/41348 A2 | 6/2001 |
| WO | WO 01/97455 A1 | 12/2001 |
| WO | WO 02/03626 A2 | 1/2002 |

* cited by examiner

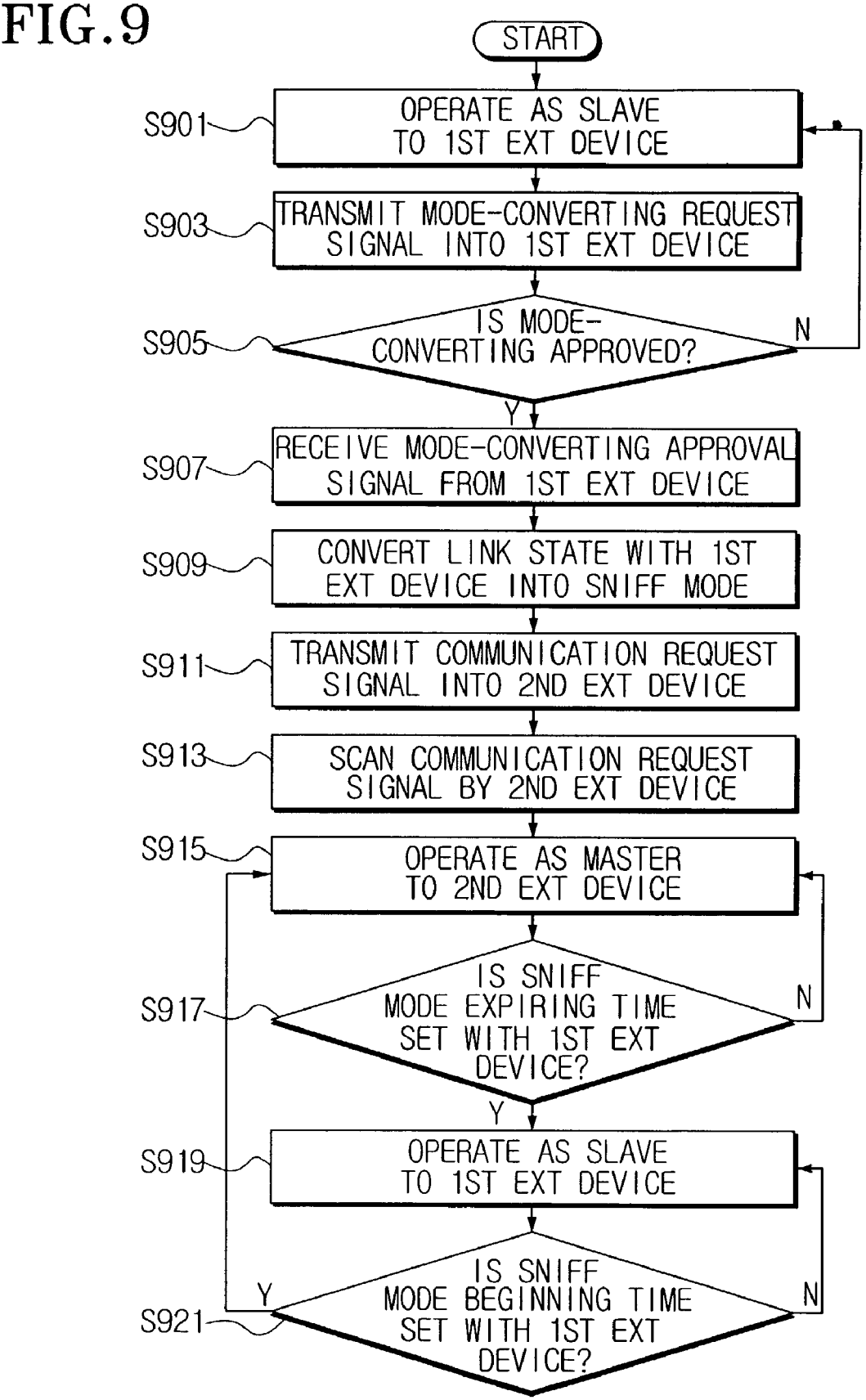

BLUETOOTH SYSTEM CAPABLE OF COMMUNICATING ON SCATTERNET AND COMMUNICATING METHOD THEREOF

This application claims priority from Korean Patent Application No. 10-2002-0004104, filed on Jan. 24, 2002, in the Korean Intellectual Property Office, the disclosure of which is incorporated herein by reference.

BACKGROUND OF THE INVENTION

1. Field of the Invention

The present invention relates to a Bluetooth system and a communicating method thereof, and more particularly, to a Bluetooth system capable of communicating data with a plurality of different communication devices on a scatternet and a communicating method thereof.

2. Description of the Related Art

Bluetooth is the code name of a radio data communication technology in use for telecommunication, networking, computing and consumer product industries. Bluetooth technology allows wireless link to replace messy cables for connecting devices within a short range. For example, if Bluetooth radio technology is embodied in both of a portable telephone and a laptop computer, it is possible to use the portable telephone and the laptop computer as linked without cables. Devices which can be a part of a Bluetooth system include a printer, a Personal Digital Assistant (PDA), a desktop computer, a FAX, a keyboard and a joy stick together with all digital devices in practice.

In general, Bluetooth technology has the maximum data transmission rate of 1 Mbps and the maximum transmission distance of 10 m. 1 Mbps is the transmission rate in the range of 2.4 GHz Industrial Scientific Medical (ISM) frequency bandwidth which is available for a user without a license, and can be realized at low-cost. Further, the transmission distance of 10 m is determined sufficient as a transmission distance between a device carried by the user and a PC on a desk in an office.

Further, since Bluetooth is devised to operate in a radio frequency environment having a large quantity of noise, Bluetooth adopts the frequency hopping technique with a hopping rate up to 1600 hops/s so as to stably transmit/receive data in a radio frequency with a large quantity of noise. The frequency hopping technique is also called Frequency Hopping Spread Spectrum (FHSS) technique. The FHSS technique primarily divides a given frequency band into more number of hopping channels, and allocates (medium frequency) signals which are first modulated in a transmitting side to hopping channels different from one another according to a predetermined order when the signals are frequency-converted into a Radio Frequency (RF) bandwidth (2.4 GHz). The channels to which the signals are allocated are changed at a high rate to reduce effects of multi-channel interference and narrow-band impulse-based noise. A receiving side connects the signals received in several hopping channels as scattered into the same order as in the transmitting side to restore the original signals. The IEEE 802.11 uses 79 hopping channels, which are distanced from one another with an interval of 1 MHz. When the signals are allocated hopping the several channels, any two adjacent channels have an interval of at least 6 MHz for avoiding mutual interaction therebetween. The rate of changing the hopping channels, i.e. hopping rate, is regulated at least 2.5 hops/s.

The Bluetooth system supports not only one-to-one link but also one-to-multi link. In the Bluetooth system, as shown in FIG. 1, several communication devices can be organized and linked together about one communication device. The communication devices each are discriminated according to frequency hopping orders different from one another. The communication devices are linked as above to constitute a network so-called piconet 10. The piconet 10 means a component unit of a Bluetooth system which is constituted by connecting at least one slave 13 to one master 11. One piconet 10 can have one master 11 and the maximum 7 slaves 13. The master 11 determines the overall characteristics about channels in the piconet 10. The master 11 has a Bluetooth Device Address (BD_ADDR) for determining the frequency hopping sequence and the channel access code. The clock of the master 11 determines the phase of the hopping row and sets the timing of the same. Further, the master 11 controls traffic in the channels. Any digital devices can function as the master 11, and after the piconet 10 is constituted, the master 11 and the slave 13 can exchange their roles again.

The master 11 and the slave 13 carry out bilateral communication according to Time Division Duplex (TDD) in the unit of 1 hopping slot (625 µs=1/1600 second).

FIG. 2 shows communication between the master and the slaves via TDD. Referring to FIG. 2, the channels allocated to time slots each have a length of 625 µs. The number of the time slots is determined according to the Bluetooth clock of the piconet master. The master and the slaves can selectively transmit a packet via the time slots. The master transmits the packet only in time slots designated with even numbers, and the slaves transmit the packet only in time slots designated with odd numbers. Further, it is necessary to realize the packet transmitted by the master or the slaves in 5 or less time slots. Herein, the packet means the unit of data transmitted in the piconet channel.

When the Bluetooth system is linked, the master can be operated in several power saving modes such as a hold mode, a sniff mode and a park mode. The hold mode means a mode in which the master converts into a sleep state while possessing an Active Member Address (AM_ADDR) as linked to the slave. The sniff mode means a mode in which the interval of listen is prolonged while the master possesses the AM_ADDR as linked to the slave. The park mode means a mode in which the mater converts into the sleep state by opening the AM_ADDR as linked to the slave. Before transfer into the park mode, a Parked Member Address (PM_ADDR) or an Access Request Address (AR_ADDR) is given from the master.

The AM_ADDR is expressed as a member address and used for discriminating active members participating in the piconet. When at least two slaves link to one master, the master allocates a preliminary 3 bit address which will be used until the slaves each are activated in order to discriminate the slaves. Therefore, all packets exchanged between the master and the slaves carry the AM_ADDR. The AM_ADDR of the slave is used not only in a packet from the master to the slave but also in a packet from the slave to the master. A pre-allocated AM_ADDR is resigned when the slave is not linked to the master or the slave is in the park mode, and a new AM_ADDR is allocated when the slave is linked to the master again. The piconet is restricted into one master and seven slaves since the AM_ADDR allocated to the activated slaves by the master is designated 3 bit long according to Bluetooth standard. In other words, the piconet has the maximum eight addresses, but "000" address is used by the master for broadcasting the slaves, and the remaining seven addresses from "001" to "111" are used by the slaves.

A communication device in one piconet can carry out data communication with any communication devices in another piconet. A plurality of piconets are organically linked to constitute a network so-called scatternet.

The scatternet is comprised of at least two piconets which are gathered to constitute a new network where each of the piconets maintains its unique hopping frequency. Further, it is requested that communication devices participating in constitution of the scatternet can be inevitably converted between the scatternet communication and the piconet communication.

However, when a Bluetooth system belongs to the scatternet, the following situations may take place: The Bluetooth system may operate as a master while operating as a slave at the same time or operate as a slave to any master while operating as a slave to another master at the same time. In other words, the Bluetooth system is necessarily capable of transmitting/receiving data into/from at least two external devices respectively belonging to different piconets while preventing collision between the transmitted data.

SUMMARY OF THE INVENTION

It is an object of the present invention to provide a radio-communicating system and method capable of communicating with at least two external devices belonging to different piconets without data collision.

According to an aspect of the invention to solve the above object, there is provided a communicating method in a Bluetooth system operating as a master to a first external device, the method comprising the steps of: receiving a communication request signal from a second external device; scanning the received communication request signal to convert the operation of the Bluetooth system from as the master to the first external device into as a slave to the second external device; and transmitting a mode-converting request signal into the second external device to convert the link state of the Bluetooth system with the second external device into a sniff mode in converting the operation of the Bluetooth system from as the slave to the second external device into as the master to the first external device.

Preferably, the communicating method further comprises the steps of: receiving a mode-converting approval signal from the second external device in response to the mode-converting request signal; converting the link state of the Bluetooth system with the second external device into the sniff mode; if the transmitted mode-converting request signal is rejected by the second external device, disconnecting a link to the second external device and converting into the operation as the master to the first external device; judging whether it is the expiring time of the sniff mode set between the Bluetooth system and the second external device when the Bluetooth system operates as the master to the first external device; and if it is the expiring time of the sniff mode set between the Bluetooth system and the second external device, converting the operation of the Bluetooth system from as the master to the first external device into as the slave to the second external device.

According to another aspect of the invention to solve the above object, it is provided a communicating method of a Bluetooth system operating as a slave to a first external device, the method comprising the steps of: transmitting a first mode-converting request signal into the first external device to convert the link state of the Bluetooth system with the first external device into a first sniff mode; if the mode-converting request signal is approved by the first external device, converting the link state of the Bluetooth system with the first external device into the first sniff mode; receiving a communication request signal from a second external device; scanning the communication request signal to convert the operation of the Bluetooth system from as the slave to the first external device into as a slave to the second device; and transmitting a second mode-converting request signal into the second external device to convert the link state of the Bluetooth system with the second external device into a second sniff mode in converting the operation of the Bluetooth system from as the slave to the second external device into as the slave to the first external device.

Preferably, the communicating method further comprises the steps of: receiving a mode-converting approval signal from the second external device in response to the mode-converting request signal; converting the link state of the Bluetooth system with the second external device into the second sniff mode; if the transmitted mode-converting request signal is rejected by the second external device, disconnecting a link to the second external device and converting into the operation as the slave to the first external device; judging whether it is the expiring time of the second sniff mode set between the Bluetooth system and the second external device when the Bluetooth system operates as the slave to the first external device; and if it is the expiring time of the second sniff mode set between the Bluetooth system and the second external device, converting the operation of the Bluetooth system as the slave to the first external device into as the slave to the second external device, in which the first sniff mode set between the Bluetooth system and the first external device and the second sniff mode set between the Bluetooth system and the second external device are preferably set to alternate with the same period and time interval.

According to further another aspect of the invention to solve the above object, it is provided a communicating method of a Bluetooth system operating as a slave to a first external device, the method comprising the steps of: transmitting a mode-converting request signal into the first external device to convert the link state of the Bluetooth system with the first external device into a sniff mode; if the transmitted mode-converting request signal is approved by the first external device, converting the link state of the Bluetooth system with the first external device into the sniff mode; transmitting a communication request signal into the second external device; and upon scanning the communication request signal by the second external device, converting the operation of the Bluetooth system from as the slave to the first external device into as a master to the second external device.

Preferably, the communicating method further comprises the steps of: judging whether it is the expiring time of the sniff mode set between the Bluetooth system and the first external device when the Bluetooth system operates as the master to the second external device; if it is the expiring time of the sniff mode set between the Bluetooth system and the first external device, converting the operation of the Bluetooth system as the master to the second external device into as the slave to the first external device; judging whether it is the beginning time of the sniff mode set between the Bluetooth system and the first external device when the Bluetooth system operates as the slave to the first external device; and if it is the beginning time of the sniff mode set between the Bluetooth system and the first external device, converting the operation of the Bluetooth system as the slave to the first external device into as the master to the second external device, in which the mode-converting request signal is preferably re-transmitted into the first external device while the Bluetooth system maintains the operation as the slave to the first external device if the transmitted mode-converting request signal is rejected by the first external device.

According to further another aspect of the invention to solve the above object, it is provided a Bluetooth system for radio-transmitting/receiving data comprising: a mode-converting requesting unit for sending a first converting-into-sniff mode request to a second external device to communicate with the first external device when link to the second external device is initialized by scanning a communication request signal from the second external device as the Bluetooth system is linked to the first external device; a mode-converting unit for converting the link state with the second external device into a sniff mode if the request is approved by the second external device; and a transmitting/receiving unit for communicating with the first external device when the link state with the second external device is converted into the sniff mode, in which the mode-converting requesting unit sends a second converting-into-sniff mode request to the first external device to communicate with the second external device, and if the request is approved by the second external device, the transmitting/receiving unit communicates with the second external device as link to the first external device is converted into the sniff mode.

According to still another aspect of the invention to solve the above object, it is provided a Bluetooth system for radio-transmitting/receiving data comprising: a mode-converting requesting unit for transmitting a mode-converting request signal for converting-into-sniff mode into a first external device to convert the link state with the first external device into a sniff mode in transmitting a communication request signal into a second external device as the Bluetooth system is linked to the first external device; a mode-converting unit for converting the link state with the first external device into the sniff mode if the request is approved by the first external device; a link-initializing unit for initializing link to the second external device if the transmitted communication request signal is scanned by the second external device; and a transmitting/receiving block for communicating with the second external device as link to the first external device is converted into the sniff mode, in which the mode-converting unit maintains the link state with the first external device and re-transmits the mode-converting request signal if the mode-converting request signal is rejected by the first external device.

Hereinafter the invention will be described in more detail in reference to the accompanying drawings.

BRIEF DESCRIPTION OF THE DRAWINGS

The above and other objects, features and other advantages of the present invention will be more clearly understood from the following detailed description taken in conjunction with the accompanying drawings, in which:

FIG. 9 is a flow chart illustrating a process of the Bluetooth system shown in FIG. 5 converting its operation from as a slave to an arbitrary piconet into as a master to another piconet;

DETAILED DESCRIPTION OF THE PREFERRED EMBODIMENT

Figure 1:
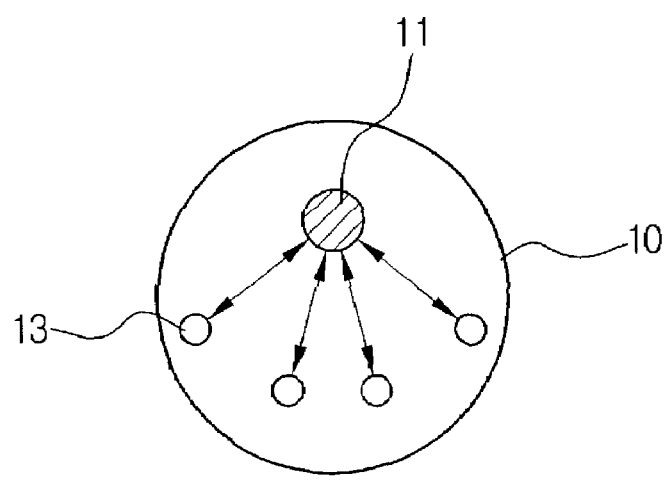
FIG. 1 shows an example of a piconet organized with Bluetooth systems.
Figure 2:
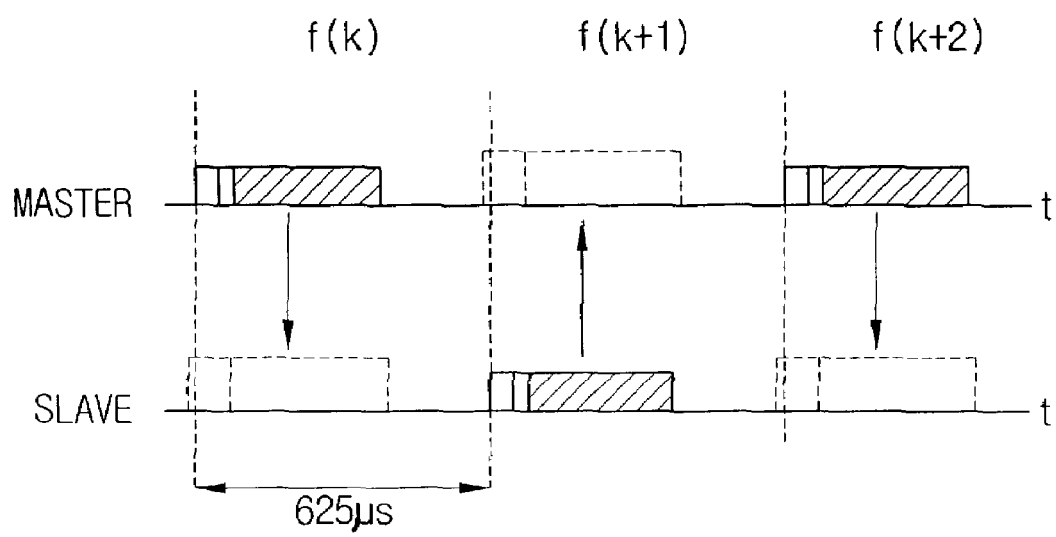
FIG. 2 illustrates communication via TDD between a mater and a slave.
Figure 3:
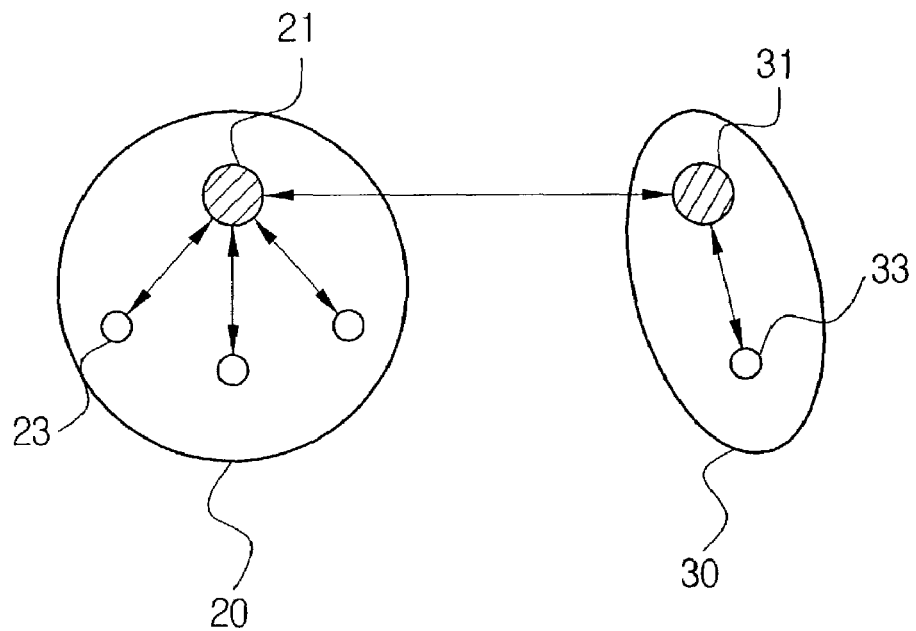
FIG. 3 shows an example in which a master to an arbitrary piconet operates as a slave to another piconet on a scatternet.
Figure 4:
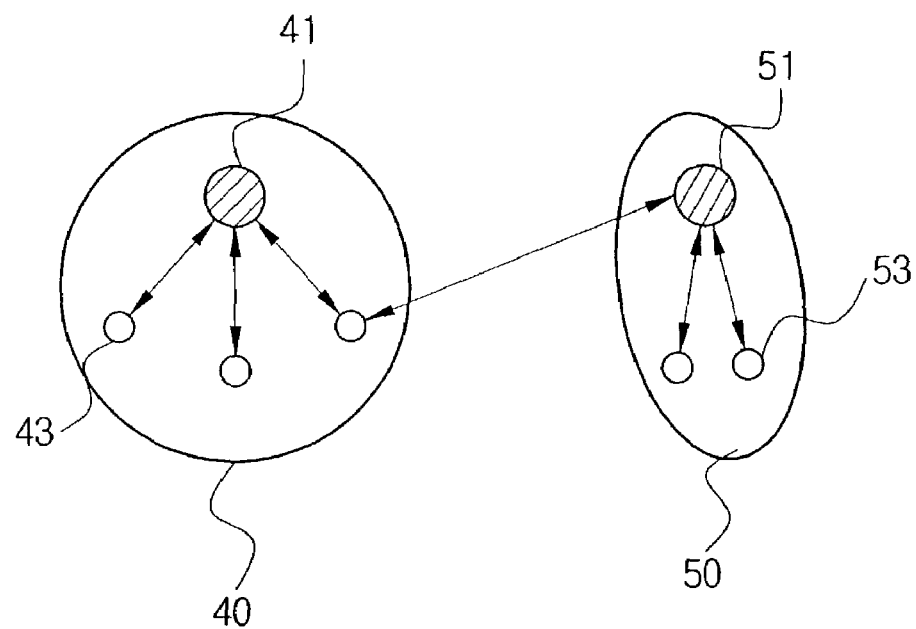
FIG. 4 shows an example in which a slave to an arbitrary piconet operates as a slave to another piconet on a scatternet.

FIG. 3 shows an example in which a master to an arbitrary piconet operates as a slave to another piconet on a scatternet, and FIG. 4 shows an example in which a slave to an arbitrary piconet operates as a slave to another piconet on a scatternet.

Referring to FIG. 3, a master 21 belonging to the first piconet 20 simultaneously operates as a slave 21 of a master 31 in the second piconet 30. Further, a slave 43 of a master 41 belonging to the first piconet 40 simultaneously operates as a slave 43 of a master 51 in the second piconet 50 as shown in FIG. 4. For the purpose of carrying out the above operations, a Bluetooth system participating in the scatternet meets a predetermined rule which is temporally determined as follows:

1) Converting from communication with a Bluetooth system belonging to any piconet (hereinafter will be referred to as piconet communication) into communication with another Bluetooth system belonging to another piconet (hereinafter will be referred to as scatternet communication) takes place most simultaneously.

2) When the master 21 carries out scatternet communication with the master 31, slaves 23 in the first piconet 20 cannot communicated with the master or slaves 33 in the second piconet 30 cannot communicate with the master 31.

3) When a communication device performing scatternet communication functions as the slave 43 in the piconet 40, the slave 43 cannot respond to the master 41 while carrying out scatternet communication. Therefore, it is necessary to realize an algorithm preventing the master 41 from sending a packet into the slave 43 in this interval.

Figure 5:
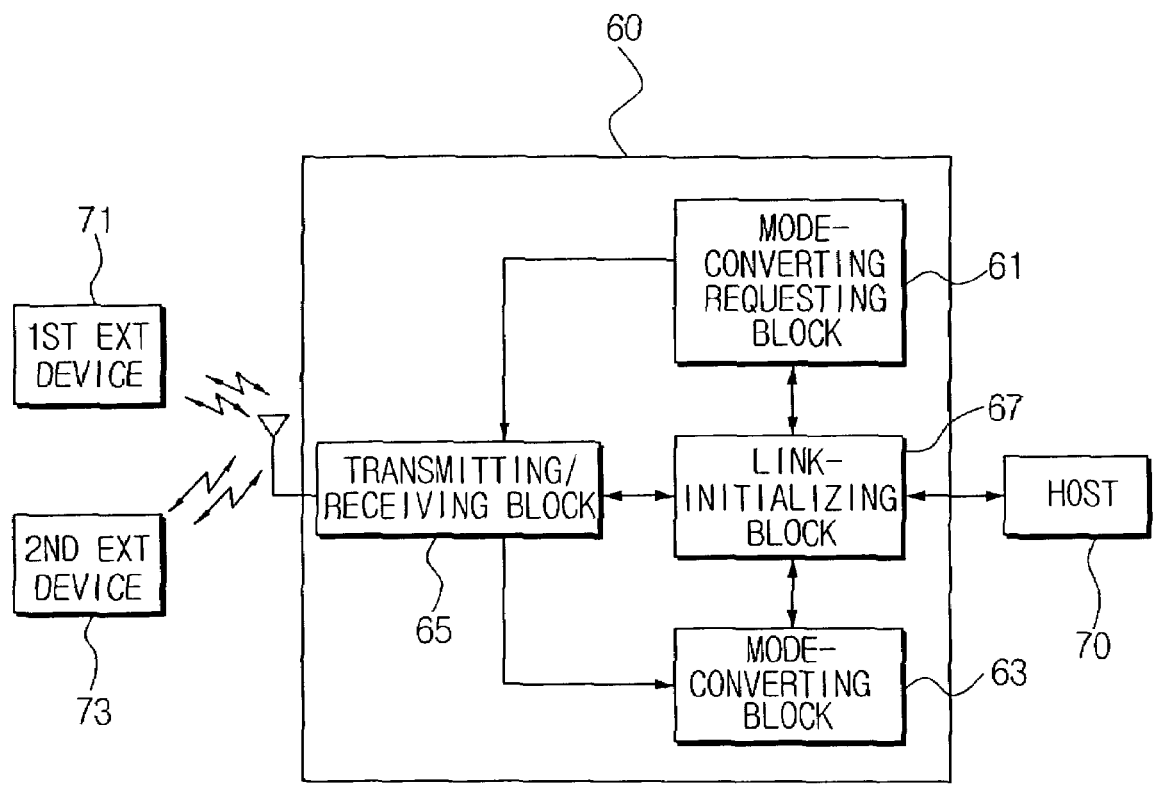
FIG. 5 is a block diagram illustrating a Bluetooth system according to an embodiment of the invention.

FIG. 5 is a block diagram illustrating a Bluetooth system according an embodiment of the invention.

Referring to FIG. 5, the Bluetooth system 60 has a mode-converting requesting block 61, a mode-converting block 63, a transmitting/receiving block 65 and a link-initializing block 67.

When the Bluetooth system 60 linked to the first external device 71 initializes link to the second external device 73 to transmit/receive data into/from the same, the mode-converting requesting block 61 requests converting-into-sniff mode to the second external device 73 in order to communicate with the first external device 71. In other words, in the case that the Bluetooth system 60 operating as the master to the first external device 71 initializes communication with the second external device 73, the mode-converting requesting block 61 transmits a request signal of converting-into-sniff mode into the second external device 73 in order to communicate with the first external device 71. When the request signal transmitted from the mode-converting requesting block 61 is approved by the second external device 73, the link state between the Bluetooth system 60 and the second external device 73 is converted into a sniff mode, and then the Bluetooth system 60 communicates with the first external device 71.

Alternatively, in the case that the Bluetooth system 60 operating as a slave to the first external device 71 initializes communication with the second external device 73, the mode-converting requesting block 61 requests converting-into-sniff mode to the first external device 71 in order to communicate with the second external device 73 or to the second external device 73 in order to communicate with the first external device 71.

If the request from the mode-converting requesting block 61 is approved by the first external device 71 or the second external device 73, the mode-converting block 63 converts the link state with the first external device 71 or the second external device 73 into the sniff mode.

If the request from the mode-converting requesting block 61 is rejected by the first external device 71, it is preferred that the mode-converting block 63 disconnects a link to the first external device 71 and communicates with the second external device 73. On the other hand, if the request from the mode-converting requesting block 61 is rejected by the second external device 73, it is preferred that the mode-converting block 63 disconnects the to the second external device 73 and communicates with the first external device 71.

The transmitting/receiving block 65 processes an externally received signal, e.g. RF signal, and transmits a data packet subject to transmission into the outside. In this case, the transmitting/receiving block 65 communicates the data packet with the second external device 73 or the first external device 71 as the link state with the first external device 71 or the second external device 73 is converted into the sniff mode by the mode-converting block 63.

While communicating with the first external device 71, the link-initializing block 67 initializes communication with the second external device 73 for transmitting/receiving data. In other words, in order that the Bluetooth system 60 may communicate with the second external device 73 as the master, the link-initializing block 67 transmits a communication request signal into the second external device 73. As soon as the second external device 73 scans the transmitted communication request signal, the Bluetooth system 60 communicates with the second external device 73. Alternatively, in order that the Bluetooth system 60 may communicate with the second external device 73 as the slave, the link-initializing block 67 scans the communication request signal from the second external device 73. Then, the Bluetooth system 60 communicates with the second external device 73. In this case, the Bluetooth system 60 communicates with a host 70 which performs original functions of a device mounted with the Bluetooth system 60. The Bluetooth system 60 radio-transmits/receives data, which are communicated with the host 70, into/from the first external device 71 or the second external device 73. Accordingly, the radio communication device mounted with the Bluetooth system 60 can communicate with the external device as converting from piconet communication into scatternet communication, and vice versa.

Figure 6:
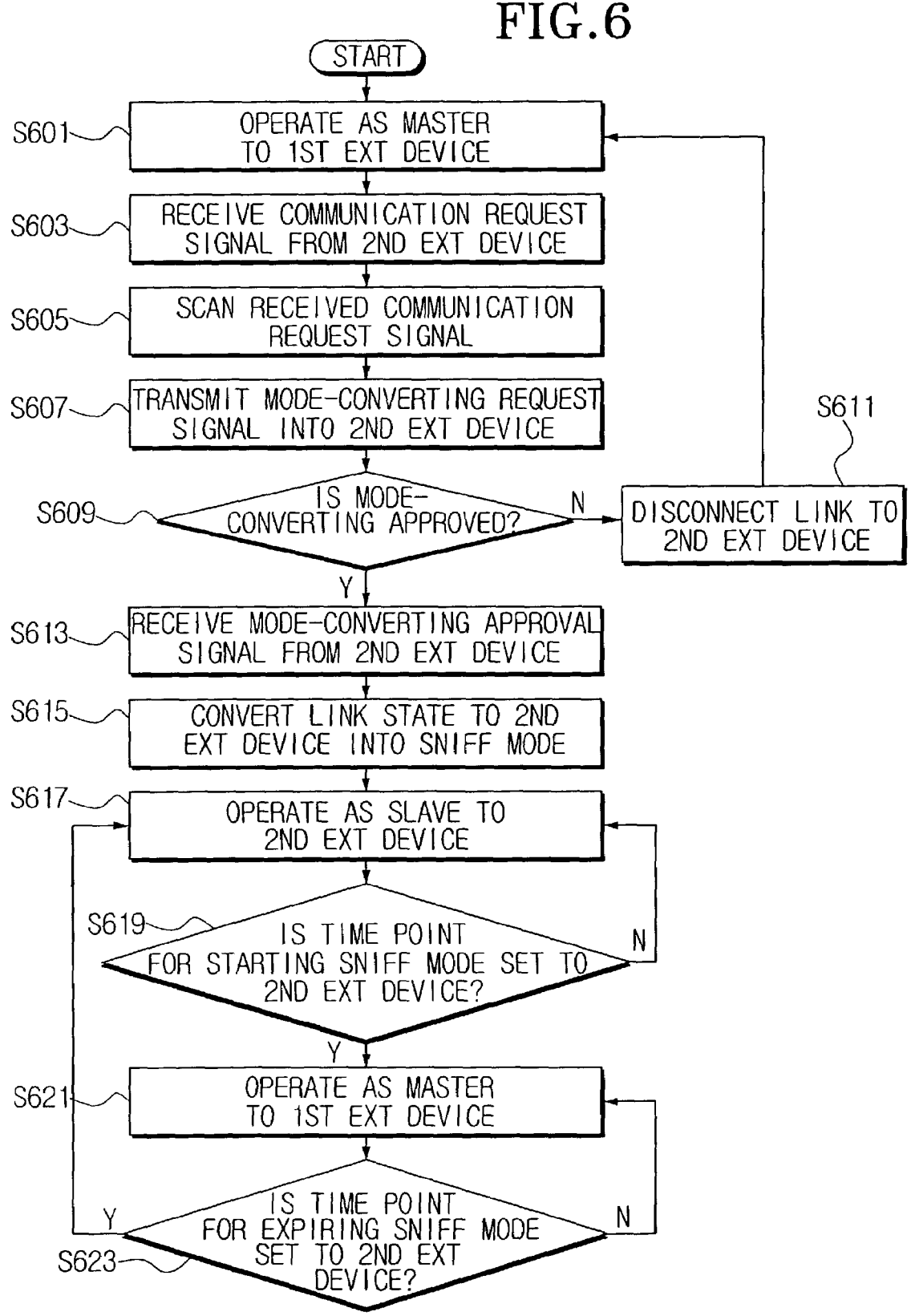
FIG. 6 is a flow chart illustrating a process of the Bluetooth system shown in FIG. 5 converting its operation from as a master to an arbitrary piconet into as a slave to another piconet.
Figure 7:
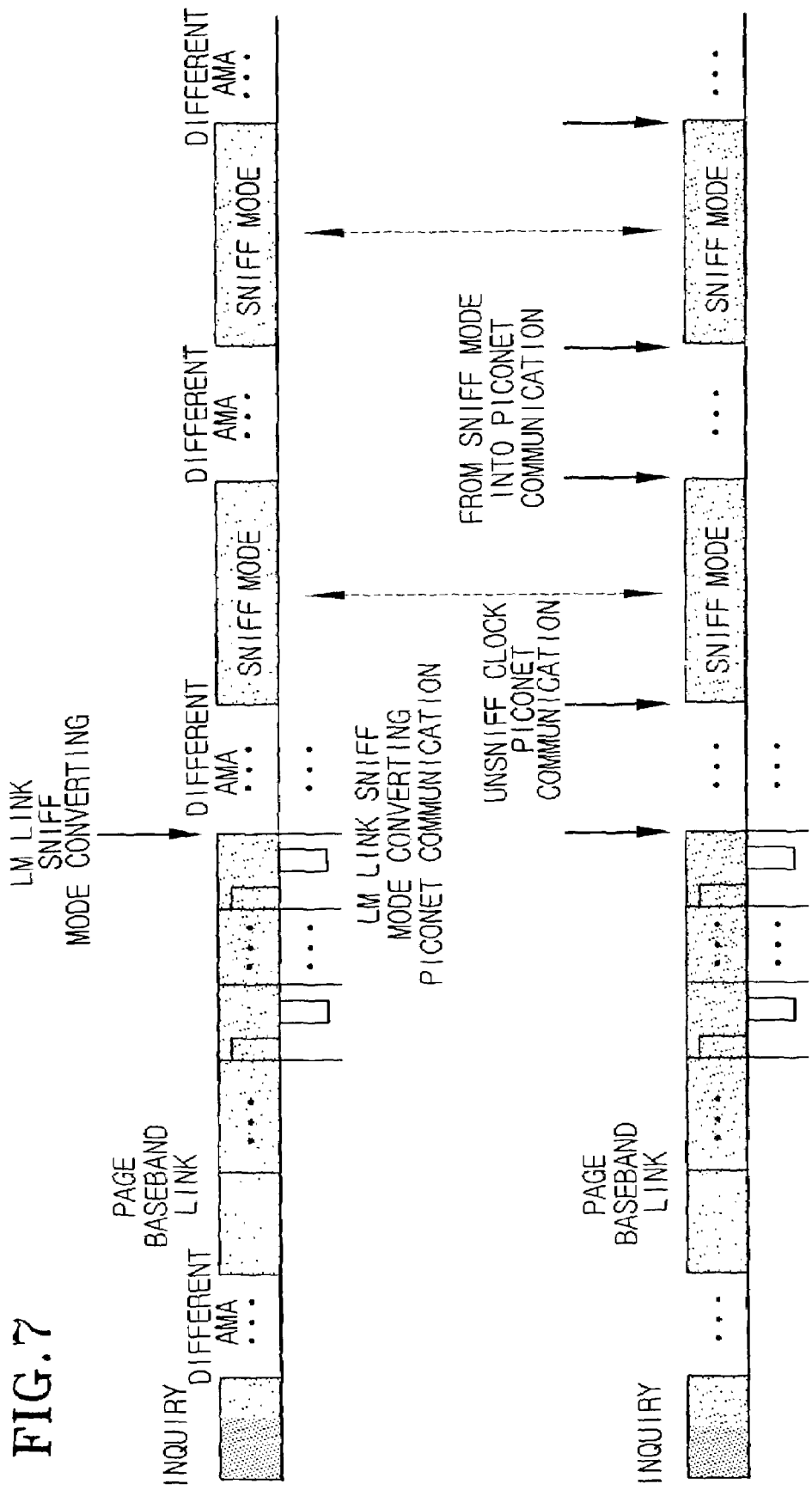
FIG. 7 illustrates the process shown in FIG. 6.

FIG. 6 is a flow chart illustrating a process of the Bluetooth system shown in FIG. 5 converting its operation from as a master to an arbitrary piconet into as a slave to another piconet, and FIG. 7 illustrates the process shown in FIG. 6.

Referring to FIG. 6 and FIG. 7, the Bluetooth system 60 operates as the master to the first external device 71 in an arbitrary piconet in S601. When the Bluetooth system 60 operates as the master to the first external device 71, upon receiving a communication request signal from the second external device 73 in S603, the link-initializing block 67 scans the communication request signal in S605. The communication request signal utilizes inquiry and paging processes, and the scanning about the communication request signal utilizes scanning processes about inquiry and paging. In this case, the inquiry process finds addresses and clocks of devices existing in a given range. The paging process is periodically executed by the master to wake up at least one slave.

The link-initializing block 67 scans the communication request signal received from the second external device 73 so that the Bluetooth system 60 converts from the operation as the master to the first external device 71 into the operation as the slave to the second external device 73. In this case, the data communicated between the first external device 71 and the Bluetooth system 60 are completely transmitted/received before the Bluetooth system 60 converts into the operation as the slave to the second external device 73.

In order that the Bluetooth system 60 may communicate with the first external device 71, the mode-converting requesting block 61 of the Bluetooth system 60 transmits the mode-converting requesting signal into the second external device 73 so that the link state between the Bluetooth system 60 and the second external device 73 converts into a sniff mode in S607. If the transmitted mode-converting requesting signal is approved by the second external device 73 in S609, the Bluetooth system receives a mode-converting approval signal from the second external device 73 in S613. Upon receiving the mode-converting approval signal, the mode-converting block 63 of the Bluetooth system 60 converts the link state between the second external device and the Bluetooth system into the sniff mode in S615. As the link state with the second external device 73 converted into the sniff mode, the transmitting/receiving block 65 of the Bluetooth system 60 communicates with the first external device 71 as the master to the first external device.

If the transmitted mode-converting request signal is rejected by the second external device 73, the mode-converting block 63 of the Bluetooth system 70 disconnects a link to the second external device 73, the transmitting/receiving block 65 of the Bluetooth system 60 communicates with the first external device 71 as link to the second external device 73 is disconnected.

The sniff mode set between the Bluetooth system and the second external device 73 is periodically repeated at a predetermined interval. In other words, the Bluetooth system 60 communicates with the second external device 73 as the slave to the second external device in a time range except for a time interval of the sniff mode set between the Bluetooth system 60 and the second external device 73 in S617. At an initializing time of the sniff mode set between the Bluetooth system 60 and the second external device 73 in S619, the mode-converting block 63 of the Bluetooth system 60 converts from the operation as the slave to the second external device 73 into the operation as the master to the first external device 71 in S621. At the expiring time of the sniff mode set between the Bluetooth system 60 and the second external device 73 in S623, the mode converting-block 63 of the Bluetooth system 60 converts from the operation as the master to the first external device 71 into the operation of the slave to the second external device 73 in S617. The above operation converting process is periodically repeated according to a predetermined interval of the sniff mode.

According to the above process, the Bluetooth system of the invention operates as the master to an arbitrary piconet while operating as the slave to another piconet.

Figure 8A:
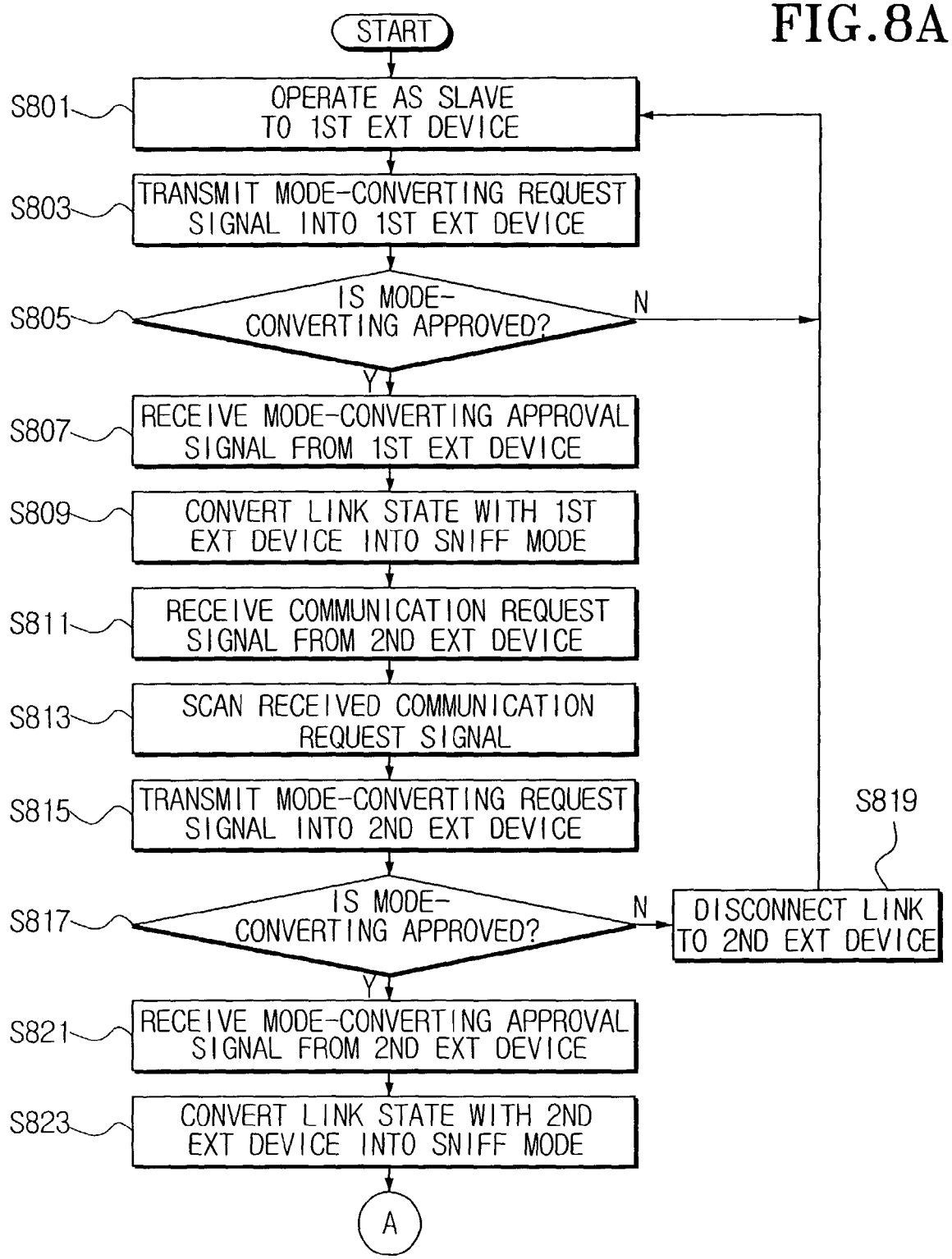
FIGS. 8A and 8B are a flow chart illustrating a process of the Bluetooth system shown in FIG. 5 converting its operation from as a slave to an arbitrary piconet into as a master to another piconet.
Figure 8B:
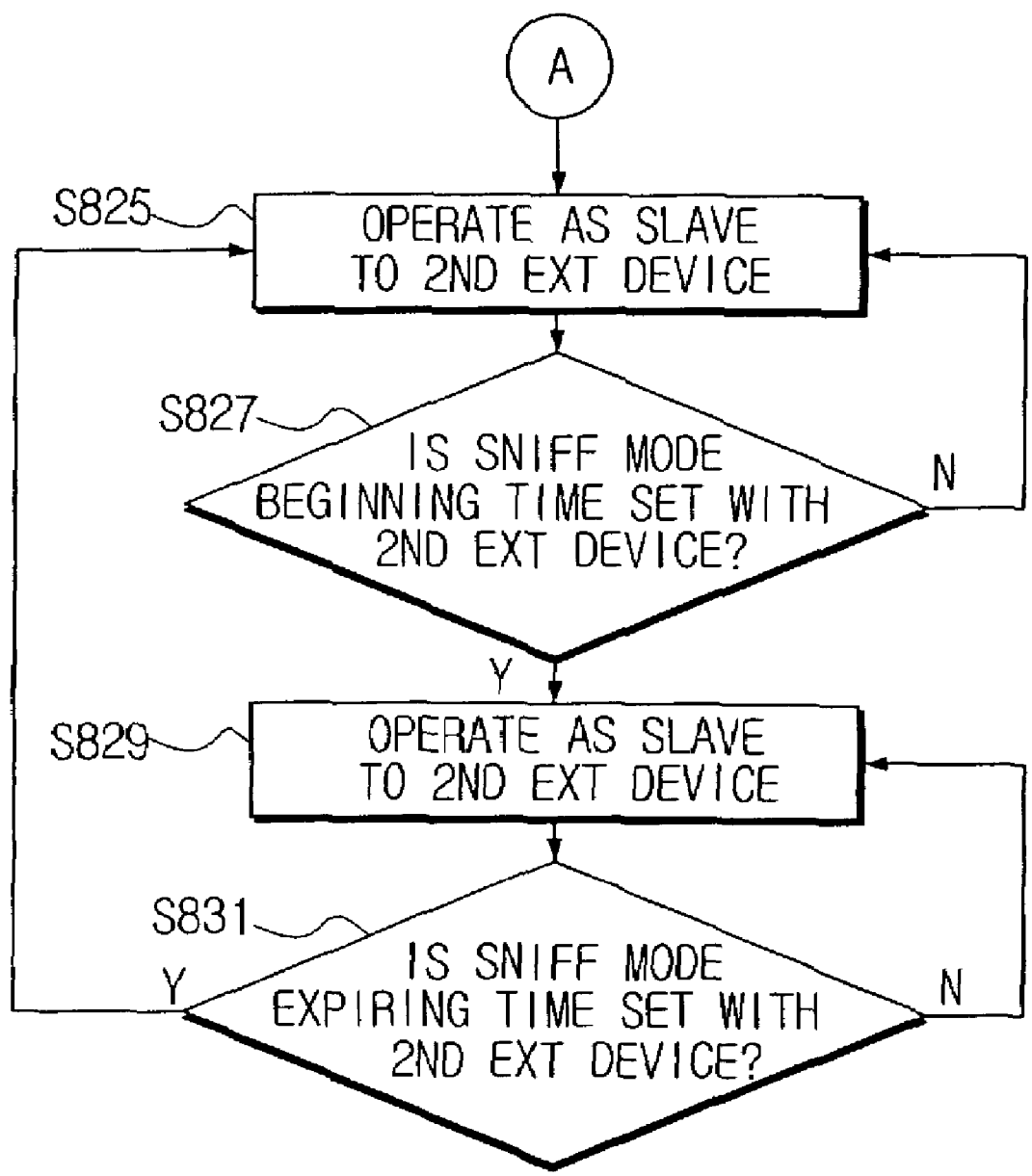

FIGS. 8A and 8B are a flow chart illustrating a process of the Bluetooth system shown in FIG. 5 converting its operation from as a slave to an arbitrary piconet into as a master to another piconet.

Referring to FIGS. 8A and 8B, the Bluetooth system 60 operates as the slave to the first external device 71 in an arbitrary piconet in S801. In order that the Bluetooth system 60 may link to the second external device 73 as the slave while operating as the slave to the first external device 71, the mode-converting requesting block 61 of the Bluetooth system 60 transmits a mode-converting request signal into the first external device 71 so that the link state between the Bluetooth system 60 and the first external device 71 converts into the sniff mode in S803. If the mode-converting request signal transmitted from the mode-converting requesting block 61 is approved by the first external device 71 in S805, the Bluetooth system 60 receives a mode-converting approval signal from the first external device 71 in S807. If the mode-converting request signal transmitted from the mode-converting requesting block 61 is not approved by the first external device 71 in S805, the Bluetooth system 60 maintains the operation as the slave to the first external device 71 in S801.

Upon receiving the mode-converting approval signal, the mode-converting block 63 of the Bluetooth system 60 converts the link state with the first external device 71 into a sniff mode in S809.

At the beginning of the sniff mode set between the Bluetooth system 60 and the first external device 71, the transmitting/receiving block 65 of the Bluetooth system 60 receives a communication request signal from the second external device 73 in S811. Upon receiving the communication request signal from the second external device 73, the link-initializing block 67 of the Bluetooth system 60 scans the received communication request signal in S813. As set forth above, the communication request signal utilizes inquiry and paging processes, and the scanning about the communication request signal utilizes scanning processes about inquiry and paging.

The link-initializing block 67 scans the communication request signal received from the second external device 73 so that the Bluetooth system 60 converts from the operation as the slave to the first external device 71 into the operation as the slave to the second external device 73.

In order that the Bluetooth system 60 may communicate with the first external device 71 while operating as the slave to the second external device 73, the mode-converting requesting block 61 of the Bluetooth system 60 transmits a mode-converting request signal into the second external device 73 in S815. If the transmitted mode-converting request signal is approved by the second external device 73, the Bluetooth system 60 receives a mode-converting approval signal from the second external device 73 in S821. Upon receiving the mode-converting approval signal, the mode-converting block 63 of the Bluetooth system 60 converts the link state of the Bluetooth system 60 with the second external device 73 into the sniff mode in S823. As the link state with the second external device 73 is converted into the sniff mode, the transmitting/receiving block 65 of the Bluetooth system 60 communicates with the first external device 71 as the slave to the first external device 71.

If the transmitted mode-converting request signal is rejected by the second external device 73, the mode-converting block 63 of the Bluetooth system 60 disconnects the link to the second external device 73 in S819, and the transmitting/receiving block 65 of the Bluetooth system 60 communicates with the first external device 71 as the slave to the first external device 71 as link to the second external device is disconnected.

The sniff mode set between the Bluetooth system 60 and the second external device 73 is periodically repeated with a predetermined time interval as in the sniff mode set between the Bluetooth system and the first external device 71. In other words, in a time range except for the time interval of the sniff mode set between the Bluetooth system 60 and the second external device 73, the Bluetooth system 60 communicates with the second external device 73 as the slave to the second external device 73 in S825. At the beginning time of the sniff mode set between the Bluetooth system 60 an the second external device 73 in S827, the mode-converting block 63 of the Bluetooth system 60 converts from the operation as the slave to the second external device 73 into the slave to the first external device 71 in S829. At the expiring time of the sniff mode set between the Bluetooth system 60 and the second external device 73 in S831, the mode-converting block 63 of the Bluetooth system 60 converts from the operation as the slave to the first external device 71 into the slave to the second external device 73 in S825. The above operation converting process is periodically repeated according to a predetermined interval of the sniff mode. Preferably, the sniff modes set between the Bluetooth system 60 and the first external device 71 and between the Bluetooth system 60 and the second external device 73 are set to alternate with the same time interval and the same period.

Therefore, the Bluetooth system 60 of the invention can operate as the slave in any piconet while operating as the slave in another piconet.

FIG. 9 is a flow chart illustrating a process of the Bluetooth system shown in FIG. 5 converting its operation from as a slave to an arbitrary piconet into as a master to another piconet.

Referring to FIG. 9, the Bluetooth system 60 operates as the slave to the first external device 71 in an arbitrary piconet in S901. In order that the Bluetooth system 60 may communicate with the second external device 73 while operating as the slave to the first external device 71, the mode-converting requesting block 61 of the Bluetooth system 60 primarily transmits a mode-converting request signal into the first external device 71 so that the link state of the Bluetooth system 60 with the first external device 71 converts into a sniff mode in S903. If the mode-converting request signal from the mode-converting requesting block 61 is approved by the first external device 71 in S905, the Bluetooth system 60 receives a mode-converting approval signal from the first external device 71 in S907. If the mode-converting request signal from the mode-converting requesting block 61 is not approved by the first external device 71 in S905, the Bluetooth system 60 maintains the operation as the slave to the first external device 71 in S901.

Upon receiving the mode-converting approval signal, the mode-converting block 63 of the Bluetooth system 60 converts the link state with the first external device 71 into the sniff mode in S909. In this case, at the beginning of the sniff mode set between the Bluetooth system 60 and the first external device 71, the link-initializing block 67 of the Bluetooth system 60 transmits a communication request signal into the second external device 73 via the transmitting/receiving block 65 in S911. When the communication request signal from the link-initializing block 67 of the Bluetooth system 60 is scanned by the second external device 73 in S913, the Bluetooth system 60 communicates with the second external device 73 as the master to the second external device 73 in S915.

The sniff mode set between the Bluetooth system 60 and the first external device 71 is periodically repeated with a predetermined time interval. In other words, at the expiring time of the sniff mode set between the Bluetooth system 60 and the first external device 71 in S917, the mode-converting block of the Bluetooth system 60 converts from the operation as the master to the second external device 73 into the operation as the slave to the first external device 71 in S919. At the beginning time of the sniff mode set between the Bluetooth system 60 and the first external device 71 in S921, the mode-converting block 63 of the Bluetooth system 60 converts from the operation as the slave to the first external device 71 into the operation as the master to the second external device 73 in S915. The above operation converting process is periodically repeated according to a predetermined interval of the sniff mode in S915.

Accordingly, the Bluetooth system of the invention can operate as the slave in any piconet while operating as the master in another piconet.

Figure 10:
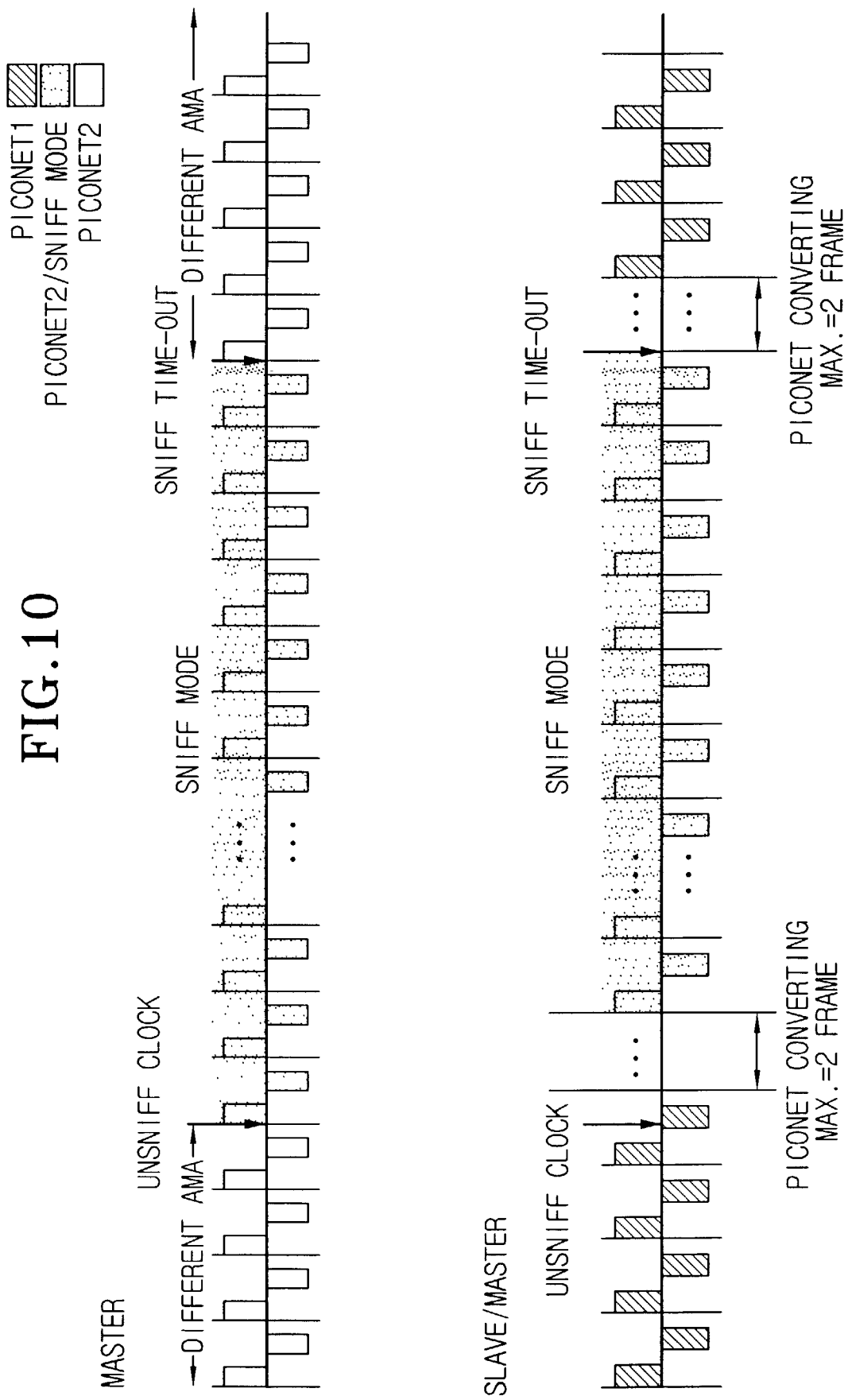
FIG. 10 illustrates a piconet converting process in which an arbitrary piconet constitutes a scatternet in cooperation with another piconet according to the Bluetooth system shown in FIG. 5.
Figure 11:
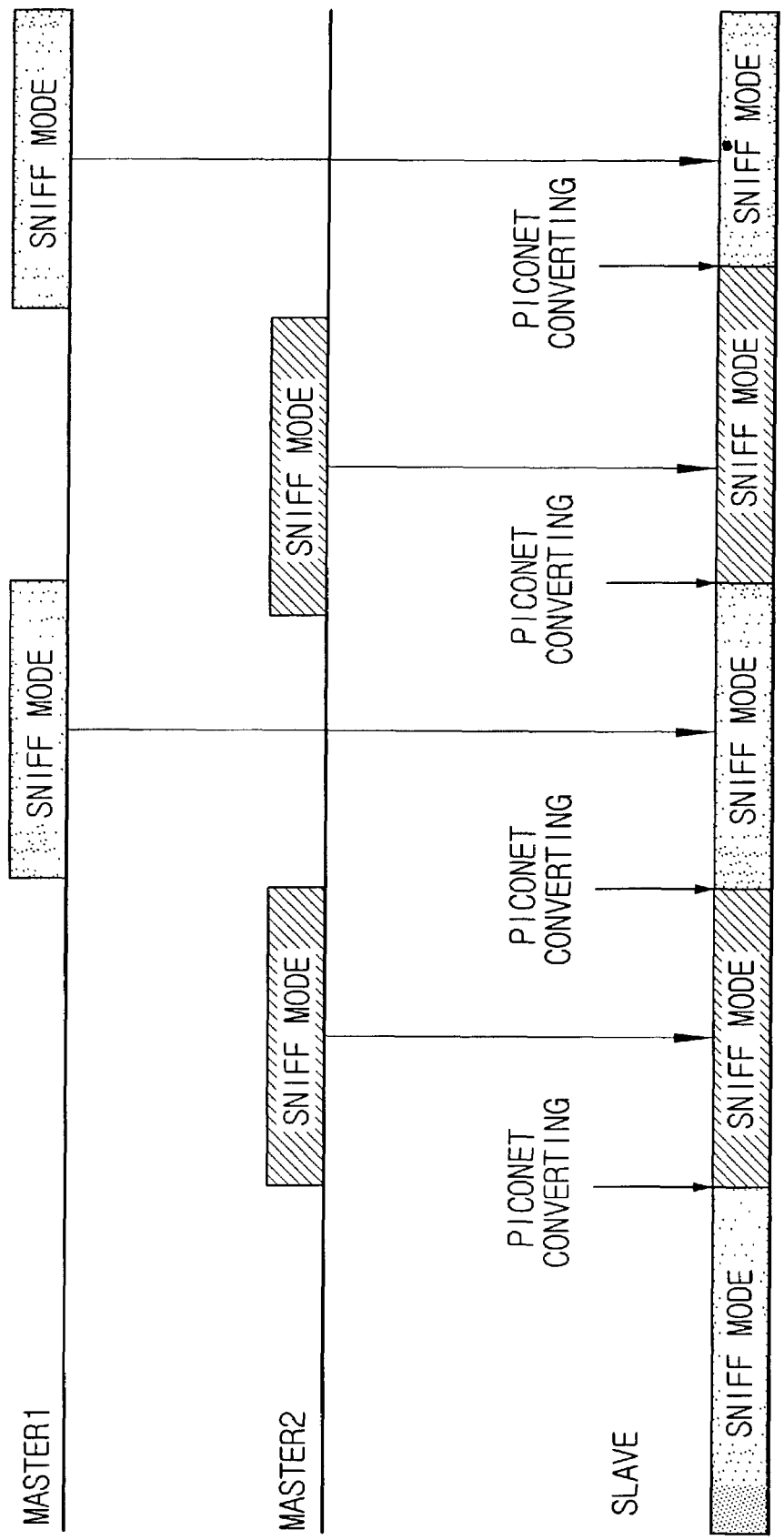
FIG. 11 illustrates a communication method in which the Bluetooth system shown in FIG. 5 operates as a slave to any communication device belonging to two different piconets in common.

FIG. 10 illustrates a piconet converting process in which an arbitrary piconet constitutes a scatternet in cooperation with another piconet according to the Bluetooth system shown in FIG. 5, and FIG. 11 illustrates a communication method in which the Bluetooth system shown in FIG. 5 operates as a slave to any communication device belonging to two different piconets in common.

Referring to FIG. 10 and FIG. 11, in the Bluetooth system 60 communicating with two different communication devices, the link state between the second external device 73 and the Bluetooth system 60 is in the sniff mode when the Bluetooth system 60 communicates with the first external device 71. On the other hand, the link state between the first device 71 and the Bluetooth system 60 is in a sniff mode when the Bluetooth system 60 communicates with the second external device 73. This allows those data communicated with the first external device 71 and communicated with the second external device 73 to be efficient transmitted/received without collision between them.

Although the above description has been made about the Bluetooth system communicating with two different communication devices, the Bluetooth system can communicate with at least three different communication devices in the same fashion as above.

According to the invention, when the Bluetooth system communicates with a plurality of different Bluetooth systems on the scatternet, the data can be efficiently transmitted/received without any mutual collision.

Although the preferred embodiments of the present invention have been disclosed for illustrative purposes, those skilled in the art will appreciate that various modifications, additions and substitutions can be made without departing from the scope and spirit of the invention as disclosed in the accompanying claims.

What is claimed is:

1. A communicating method in a Bluetooth system operating as a master to a first external device, the method comprising:
   receiving a communication request signal from a second external device while the Bluetooth system operates as the master to the first external device;
   scanning the received communication request signal to convert the operation of the Bluetooth system from the master to the first external device into a slave to the second external device;
   transmitting a mode-converting request signal to the second external device such that a link state of the Bluetooth system with the second external device is converted into a sniff mode prior to converting the operation of the Bluetooth system from the slave to the second external device into the master to the first external device;
   receiving a mode-converting approval signal from the second external device in response to the mode-converting request signal;
   converting the link state of the Bluetooth system with the second external device into the sniff mode;
   judging whether it is an expiring time of the sniff mode set between the Bluetooth system and the second external device when the Bluetooth system operates as the master to the first external device; and
   if it is the expiring time of the sniff mode set between the Bluetooth system and the second external device, converting the operation of the Bluetooth system from the master to the first external device into the slave to the second external device.

2. The communicating method of claim 1, further comprising:
   if the transmitted mode-converting request signal is rejected by the second external device, disconnecting the link with the second external device and converting the operation of the Bluetooth system into the master to the first external device.

3. A communicating method in a Bluetooth system operating as a slave to a first external device, the method comprising:
   transmitting a first mode-converting request signal to the first external device to convert a link state of the Bluetooth system with the first external device into a first sniff mode;
   if the mode-converting request signal is approved by the first external device, converting the link state of the Bluetooth system with the first external device into the first sniff mode;
   receiving a communication request signal from a second external device while the Bluetooth system operates as the slave to the first external device;
   scanning the communication request signal to convert the operation of the Bluetooth system from the slave to the first external device into a slave to the second external device;
   transmitting a second mode-converting request signal into the second external device to convert a link state of the Bluetooth system with the second external device into a second sniff mode prior to converting the operation of the Bluetooth system from the slave to the second external device into the slave to the first external device;
   receiving a mode-converting approval signal from the second external device in response to the second mode-converting request signal;
   converting the link state of the Bluetooth system with the second external device into the second sniff mode;
   judging whether it is the expiring time of the second sniff mode set between the Bluetooth system and the second external device when the Bluetooth system operates as the slave to the first external device; and
   if it is the expiring time of the second sniff mode set between the Bluetooth system and the second external device, converting the operation of the Bluetooth system from the slave to the first external device into the slave to the second external device.

4. The communicating method of claim 3, further comprising:
   if the transmitted second mode-converting request signal is rejected by the second external device, disconnecting the link with the second external device and converting the operation of the Bluetooth system into the operation as the slave to the first external device.

5. The communicating method of claim 3, wherein the first sniff mode set between the Bluetooth system and the first external device and the second sniff mode set between the Bluetooth system and the second external device are set to alternate with the same period and time interval.

6. A communicating method in a Bluetooth system operating as a slave to a first external device, the method comprising:
   transmitting a mode-converting request signal into the first external device to convert a link state of the Bluetooth system with the first external device into a sniff mode;
   if the transmitted mode-converting request signal is approved by the first external device, converting the link state of the Bluetooth system with the first external device into the sniff mode;
   transmitting a communication request signal to a second external device while the Bluetooth system operates as the slave to the first external device;
   if the transmitted communication request signal is scanned by the second external device, converting the operation of the Bluetooth system from the slave to the first external device into a master to the second external device;
   judging whether it is the expiring time of the sniff mode set between the Bluetooth system and the first external device when the Bluetooth system operates as the master to the second external device; and
   if it is the expiring time of the sniff mode set between the Bluetooth system and the first external device, converting the operation of the Bluetooth system from the master to the second external device into the slave to the first external device.

7. The communicating method of claim 6, further comprising:
   if the transmitted mode-converting request signal is rejected by the first external device, re-transmitting the mode-converting request signal into the first external device while maintaining the operation of the Bluetooth system as the slave to the first external device.

8. The communicating method of claim 6, further comprising:
   judging whether it is the beginning time of the sniff mode set between the Bluetooth system and the first external device when the first external device operates as the slave to the first external device; and
   if it is the beginning time of the sniff mode set between the Bluetooth system and the first external device, converting the operation of the Bluetooth system from the slave to the first external device into the master to the second external device.

9. A Bluetooth system for radio-transmitting/receiving data comprising:
   a mode-converting requesting unit for sending a first converting-into-sniff mode request to a second external device to communicate with a first external device, when a link to the second external device is initialized by scanning a communication request signal from the second external device, as the Bluetooth system is linked to the first external device and while the Bluetooth system operates as a master to the first external device;
   a mode-converting unit for converting the link state with the second external device into a sniff mode if the request is approved by the second external device; and
   a transmitting/receiving unit for communicating with the first external device when the link state with the second external device is converted into the sniff mode,
   wherein the transmitting/receiving unit receives a first mode-converting approval signal from the second external device in response to the first mode-converting request signal,
   wherein the mode-converting unit converts the link state of the Bluetooth system with the second external device into the sniff mode, judges whether it is an expiring time of the sniff mode set between the Bluetooth system and the second external device when the Bluetooth system operates as the master to the first external device, and if it is the expiring time of the sniff mode set between the Bluetooth system and the second external device, converts the operation of the Bluetooth system from the master to the first external device into the slave to the second external device.

10. The Bluetooth system of claim 9, wherein said mode-converting requesting unit sends a second converting-into-sniff mode request to the first external device to communicate with the second external device, and if the second converting-into-sniff mode request is approved by the first external device, said transmitting/receiving unit communicates with the second external device as the link to the first external device is converted into the sniff mode.

11. A Bluetooth system for radio transmitting/receiving data comprising:
   a mode-converting requesting unit for transmitting a mode-converting request signal for converting-into-sniff mode into a first external device to convert a link state with the first external device into a sniff mode prior to transmitting a communication request signal into a second external device as the Bluetooth system is linked to the first external device and is operating as a slave to the first external device;
   a mode-converting unit for converting the link state with the first external device into the sniff mode if the request is approved by the first external device;
   a link-initializing unit for initializing a link to the second external device if the transmitted communication request signal is scanned by the second external device; and
   a transmitting/receiving block for communicating with the second external device if the link to the first external device is converted into the sniff mode,
   wherein the mode-converting requesting unit transmits a second mode-converting request signal into the second external device to convert a link state of the Bluetooth system with the second external device into a second sniff mode prior to converting the operation of the Bluetooth system from a slave to the second external device into the slave to the first external device,
   wherein the transmitting/receiving block receiving a mode-converting approval signal from the second external device in response to the second mode-converting request signal,
   wherein the mode-converting unit converts the link state of the Bluetooth system with the second external device into the second sniff mode, judges whether it is the expiring time of the second sniff mode set between the Bluetooth system and the second external device when the Bluetooth system operates as the slave to the first external device, and if it is the expiring time of the second sniff mode set between the Bluetooth system and the second external device, converts the operation of the Bluetooth system from the slave to the first external device into the slave to the second external device.

12. The Bluetooth system of claim 11, wherein the mode-converting unit maintains the link state with the first external device and re-transmits the mode-converting request signal if the mode-converting request signal is rejected by the first external device.

* * * * *